US012585887B2

(12) United States Patent　　　　(10) Patent No.:　US 12,585,887 B2
Carrillo et al.　　　　　　　　　　　(45) Date of Patent:　　Mar. 24, 2026

(54) DATASET GENERATION AND SCALABLE TRAINING PIPELINE FOR MACHINE LEARNING BASED MULTI-FACETED HARMFUL CONTENT SANITIZATION IN LARGE LANGUAGE MODELS

(71) Applicant: INTUIT INC., Mountain View, CA (US)

(72) Inventors: Hector Carrillo, Mountain View, CA (US); Tharathorn Rimchala, Mountain View, CA (US); Royston Soares, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 189 days.

(21) Appl. No.: 18/418,039

(22) Filed: Jan. 19, 2024

(65) Prior Publication Data

US 2025/0238627 A1　　Jul. 24, 2025

(51) Int. Cl.
　　*G06F 40/40*　　　　(2020.01)
　　*G06F 40/30*　　　　(2020.01)
(52) U.S. Cl.
　　CPC .............. *G06F 40/40* (2020.01); *G06F 40/30* (2020.01)
(58) Field of Classification Search
　　CPC ............................... G06F 3/0237; G06F 40/40
　　See application file for complete search history.

(56) References Cited

U.S. PATENT DOCUMENTS

2021/0149996 A1* 5/2021 Bellegarda .......... G10L 15/1815

FOREIGN PATENT DOCUMENTS

CN　　　　108427707 B　*　5/2021　......... G06F 16/3329
WO　　WO-2019196314 A1 *　10/2019　.......... G06F 40/205

OTHER PUBLICATIONS

Linjordet, et al., "Sanitizing Synthetic Training Data Generation for Question Answering over Knowledge Graphs," ICTIR '20, Sep. 14-17, 2020. (Year: 2020).*
Babakov, et al., "Don't lose the message while paraphrasing: A study on content preserving style transfer," Springer, 2023. (Year: 2023).*
Wang, et al., "A Two-step Approach to Sentence Compression of Spoken Utterances," Proceedings of the 50th Annual Meeting of the Association for Computational Linguistics, Jul. 2012. (Year: 2012).*
Linjordet, et al., "Sanitizing Synthetic Training Data Generation for Question Answering over Knowledge Graphs," ICTIR '20, Sep. 14-17, 2020. (Year: 2020)—see attached reference in the previous Office action.*

(Continued)

*Primary Examiner* — Feng-Tzer Tzeng
(74) *Attorney, Agent, or Firm* — DLA PIPER LLP US

(57)　　　　　　ABSTRACT

A system for training and deploying a sanitizer model of a large language model (LLM) to sanitize the harmful language text. The system generates paired data sets for training using LLM techniques. Training includes a first training phase using a paired dataset to predict the benign language text in the paired dataset based on loss of information computed between the benign language text in the paired dataset and the sanitized language text. Training also includes a second training phase using a harm model that computes a harm score of the LLM prediction by adjusting the trained sanitizing step to reduce the harm score for subsequent LLM responses.

20 Claims, 10 Drawing Sheets

(56)                References Cited

OTHER PUBLICATIONS

Babakov, et al., "Don't lose the message while paraphrasing: A study on content preserving style transfer," Springer, 2023. (Year: 2023)—see attached reference in the previous Office action.*
Wang, et al., "A Two-step Approach to Sentence Compression of Spoken Utterances," Proceedings of the 50th Annual Meeting of the Association for Computational Linguistics, Jul. 2012. (Year: 2012)—see attached reference in the previous Office action.*
Wang et al., "DecodingTrust: A Comprehensive Assessment of Trustworthiness in GPT Models", arXiv:2306.11698v1 [cs.CL], Jun. 20, 2023, 95 pages.

* cited by examiner

700

710

Input Device(s)

704

712

Processor(s)

702

Network Interface(s)

708

Display Device(s)

706

Operating System

714

Network Communication

716

Applications

718

DATASET GENERATION AND SCALABLE TRAINING PIPELINE FOR MACHINE LEARNING BASED MULTI-FACETED HARMFUL CONTENT SANITIZATION IN LARGE LANGUAGE MODELS

BACKGROUND

Conventional large language models (LLMs) generate human-like text responses based on user inputs. These models utilize deep learning techniques to generate accurate responses. However, conventional LLMs could be tricked into generating responses that may be harmful including, but not limited to, responses containing toxicity, profanity, stereotype bias and poor machine ethics. Conventional LLMs are susceptible to generating such harmful responses due to adversarial prompts and/or instructions received by a bad actor user. In other words, the user can purposely cause the LLM to output a harmful response. To address these issues, conventional systems utilize a content moderation system. However, conventional content moderation systems generally only allow for content blocking or conversation termination as mitigation options. This is undesirable.

SUMMARY

Embodiments disclosed herein solve the aforementioned technical problems and may provide other technical solutions as well. Contrary to conventional content moderation techniques that simply block content or terminate conversations, the system disclosed herein implements techniques for sanitizing LLM responses to reduce harmful responses that are conventionally caused by adversarial prompts and instructions. The solution may include a sanitizer model that is separate from or integrated within the LLM model itself. The function of the sanitizer model is to analyze and sanitize the LLM response before the response is output to the user.

An example embodiment includes a method performed by a processor. The method comprises generating a paired dataset for training a sanitizer model of large language model (LLM) responses, the paired dataset including benign language text and harmful language text, executing a sanitizing step in the sanitizer model of the LLM to sanitize the harmful language text in the paired dataset to produce a sanitized language text that predicts the benign language text in the paired dataset; training the sanitizing step of the sanitizer model of the LLM, during a first training phase using the paired dataset, to predict the benign language text in the paired dataset based on loss of information computed between the benign language text in the paired dataset and the sanitized language text; and refining the trained sanitizing step of the sanitizer model of the LLM, during a second training phase using a harm model that computes a harm score of the LLM predictions, by adjusting the trained sanitizing step to reduce the harm score for subsequent LLM responses.

Another example embodiment includes a system that may comprise a non-transitory storage medium storing computer program instructions, and one or more processors configured to execute the computer program instructions to cause operations. The operations may comprise generating a paired dataset for training a sanitizer model of large language model (LLM) responses, the paired dataset including benign language text and harmful language text; executing a sanitizing step in the sanitizer model of the LLM to sanitize the harmful language text in the paired dataset to produce a sanitized language text that predicts the benign language text in the paired dataset; training the sanitizing step of the sanitizer model of the LLM, during a first training phase using the paired dataset, to predict the benign language text in the paired dataset based on loss of information computed between the benign language text in the paired dataset and the sanitized language text; and refining the trained sanitizing step of the sanitizer model of the LLM, during a second training phase using a harm model that computes a harm score of the LLM predictions, by adjusting the trained sanitizing step to reduce the harm score for subsequent LLM responses.

DETAILED DESCRIPTION OF SEVERAL EMBODIMENTS

Figure 1:
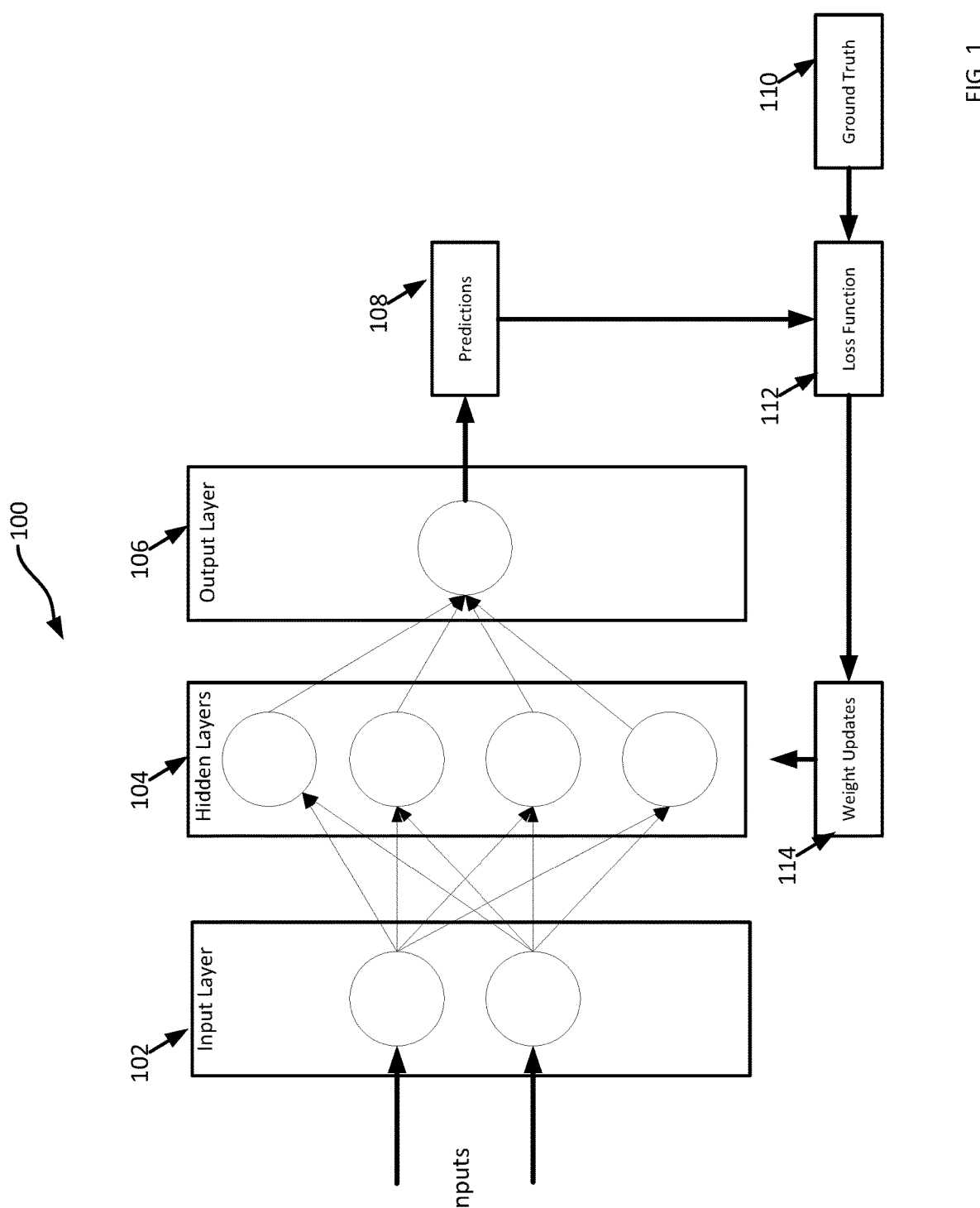
FIG. 1 shows a diagram of a sanitizer model.

To mitigate the above deficiencies, embodiments disclosed herein leverage a method to train a machine learning model that actively sanitizes potentially harmful content into neutral (non-harmful) counterparts. The solution is multi-faceted in that it is designed to tackle different types of safety concerns simultaneously. These safety concerns include topics such as toxicity, profanity, hate, sexually explicit, violence, etc. and content that contains stereotype bias, adversarial prompts and instructions, etc. The sanitization model provides an option to mitigate potentially harmful content by rephrasing instead of blocking or conversation termination.

In one example, the solution frames content sanitization as a text-to-text generation problem. In one example, sanitization model training includes a few stages: 1. Harmful and Non-Harmful paired dataset generation pipeline, 2. Supervised training using the paired dataset, and 3. Reinforcement learning using unpaired datasets (either harmful or non-harmful).

In an example, a paired dataset for training a sanitizer model of large language model (LLM) is generated where the paired dataset includes a paired benign language text (i.e., benign LLM response to a user inquiry) and corresponding harmful language text (i.e., harmful LLM response to a user inquiry). The method performs a sanitizing step in the sanitizer model. The sanitizing step sanitizes the harmful language text in the paired dataset to produce a sanitized language text that predicts the corresponding benign language text in the paired dataset (i.e., predicts the benign response in the paired dataset). The method trains the sanitizing step of the sanitizer model during a first training phase using the paired dataset to predict the benign language text in the paired dataset based on error minimization and prevention of loss of information computed between the benign language text in the paired dataset and the sanitized language text generated by the sanitizing model. The method also refines the trained sanitizing step of the sanitizer model during a second training phase using a harm model that computes a harm score of the LLM responses. The method effectively adjusts the trained sanitizing step to reduce the harm score for unpaired harm datasets leading to less harmful generations in subsequent LLM responses while also preserving desirable LLM response traits such as style, semantics and fluency to name a few.

The above-described features are now described in detail with respect to FIGS. 1-7. It is noted that the examples disclosed herein are directed to sanitization of LLM text output. However, it is noted and should be appreciated that the disclosed system and method are applicable to sanitizing all types of content responses including non-LLM generated and LLM generated images, voice, art and more.

As mentioned above LLMs can sometimes output harmful responses especially in response to adversarial prompts/instructions where an end user may have the goal of forcing the LLM to respond in a harmful manner (e.g., toxicity, profanity, stereotyping, etc.). The solution described herein trains and deploys a sanitizer model that sanitizes the LLM responses to eliminate or at least reduce the presence of harmful text presented to the end user.

The first step of the solution may include generating paired datasets that may be used for learning. For example, a public paired dataset of harmful and benign data points (e.g., harmful and benign language text responses) may be collected and used as the initial dataset. The solution may add additional harm vectors such as hate, violence, slang and/or toxicity to both the harmful and benign data points to create yet higher numbers and more challenging data points for training. The hate, violence, slang and/or toxicity may be added automatically by an LLM model specifically designed to add slang and/or toxicity to text. A training set is therefore generated to include the initial harmful and benign data points along with harmful and benign data points with additional hate, violence, slang or toxicity. It is noted that this training set generating LLM is not the same LLM being launched for execution by end users, but rather an independent LLM being used to generate the expanded dataset of data points described above.

Once the dataset is generated, training of the sanitizer model is performed. The LLM being launched for execution by end users is supplemented by the sanitizer model. In other words, the sanitizer model is a model that is to be launched as a separate model or integrated model that sanitizes the inputs and outputs of the LLM. Training of the sanitizer model disclosed herein includes two stages. In stage 1, training is supervised using the generated paired datasets described above. For example, a neural network based sanitizer model is trained via gradient based optimization techniques with back propagation. More specifically, this is achieved by inputting harmful datasets into the neural network, comparing the neural network predictions (sanitized LLM responses) to the benign data points, and adjusting the weights in the neural network. As is described in more detail below, stage 1 training may also include training the sanitizer model to minimize altering desirable aspects (e.g., style, semantics, fluency, etc.) of the response due to sanitation. In other words, the sanitizer model is trained to sanitize the responses while maintaining accuracy, coherency, etc. of the overall LLM responses. After the sanitizer model is trained in step 1, the LLM is moved to stage 2 training. Stage 2 training, for example, may include determining scores (e.g., harmful scores) for inputs and outputs of the sanitizer model and comparing the scores to determine how well the sanitizer model performs.

More details of the solution are now described with respect to the figures. Specifically, details regarding dataset generation and training for the sanitizer model are now described.

FIG. 1 shows a diagram of a neural network 100 that may be used as a sanitizer model. The neural network 100 generally includes input layer 102, hidden layers 104 and output layer 106. During operation, data is input to input layer 102. This input may include a harmful data point from the generated dataset. The neural network 100 may process the harmful data point in hidden layers 104 with the goal of sanitizing the harmful data point and outputting the sanitized data point in output layer 106. In other words, the neural network has a goal of outputting a predicted sanitized data point (i.e., sanitized LLM response) which is a benign version of the harmful data point. For example, if the harmful data point is a text response including toxicity, the neural network attempts to predict an equivalent text response without the toxicity while maintaining the important information in the response (e.g., style, semantics, fluency, etc.). In other words, the predicted text response is ideally the benign version of the harmful data point conveying the same information as the original harmful data point.

These responses 108 are generally input to loss function 112 which compares the response to ground truth data 110. In this example, the ground truth data 110 may be the benign data point that is paired with the harmful datapoint. In other words, the harmful data point input to the neural network already has a known corresponding benign data point as part of the training dataset that can be used for 1:1 comparison to determine how close the neural network response was to the benign data point of the labeled pair. The weights of the neural network are updated in block 114 based on the loss. This process is repeated for the harmful and benign labeled data pairs in the training set for a number of iterations until the neural network is fully trained.

Figure 2:
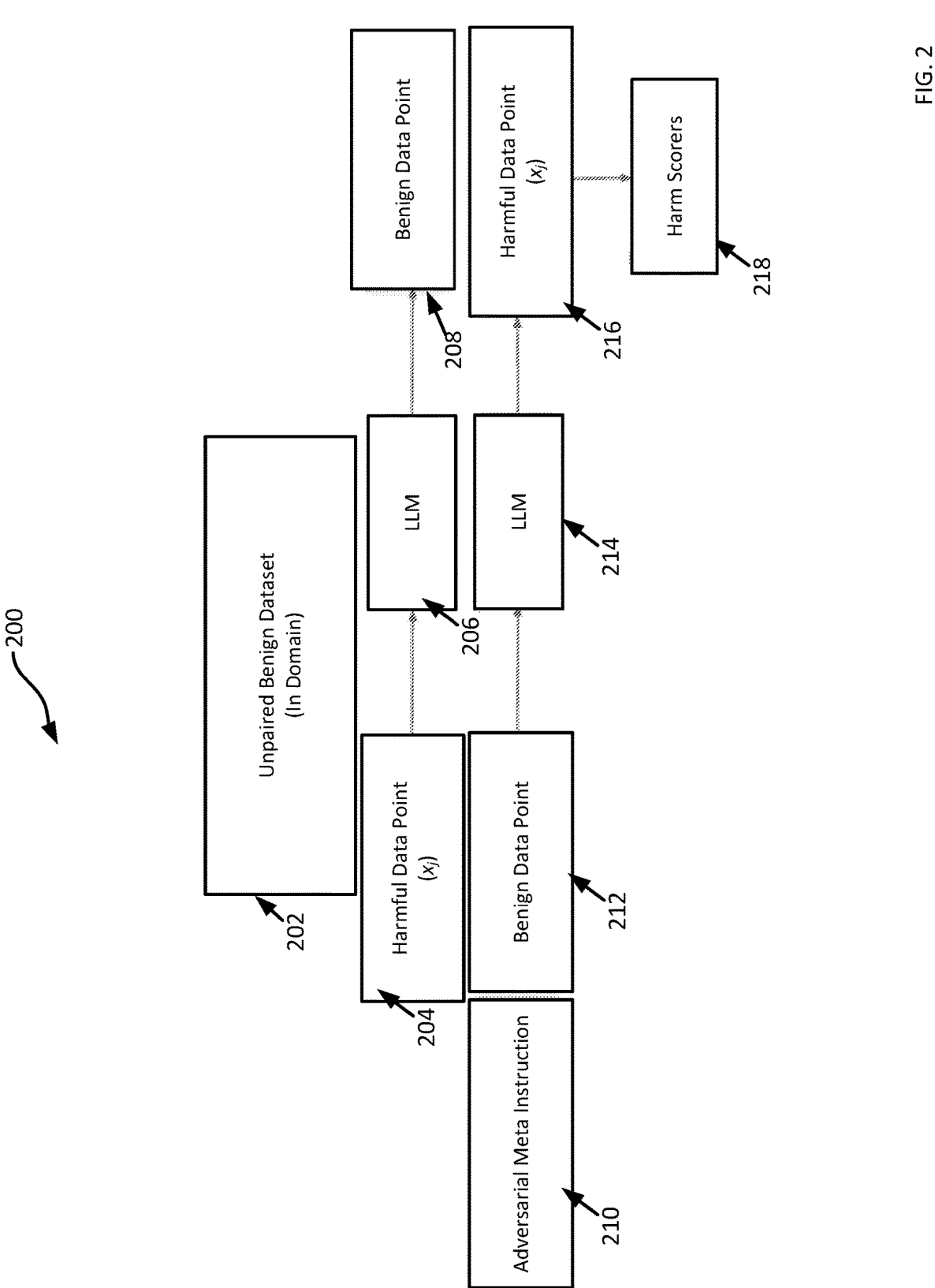
FIG. 2 shows a flowchart of dataset generation for sanitizer model, based on the principles disclosed herein.

Automatic dataset generation is a part of the overall solution described herein. FIG. 2 shows a flowchart for an example method 200 of dataset generation for the sanitizer model. The dataset generation may generally start with a publicly available paired dataset 202 that includes both harmful data points 204 and corresponding benign data points 212. In order to expand the dataset used for training the sanitizer model, the solution uses trained LLMs 206 and 214 along with optimized prompts 210 that are specifically designed to instruct the LLM to modify the datapoints according to specific parameters and rules. For example, the LLM models in FIG. 2 may add slang, toxicity, etc. to both the harmful data points 204 and benign data points 212 to produce modified harmful data points 208 and modified benign data points 216. In addition, special prompts may be used to instruct the LLM to convert harmful datapoints to corresponding benign counterparts. Trained harm scorers 218 may also compute harm scores for all of the data points. The harm scores may be used for various purposes including comparing the data points to outputs of the sanitizer model to determine how well the sanitizer model sanitized the harmful content. An example harm score is shown in equation 1 below:

$$\text{harm score} = \text{softmax } (h_A(x)) \qquad \text{(Eq. 1)}$$

where A is the trained harm categorization model such as toxic-BERT, toxigen-roBERTa. $h_A$ is a functional that takes text x as an input and returns a hidden vector corresponding to a high dimension representation of the output projected onto the representation space (e.g., the last layer) of the trained harm categorization model.

Although not shown, the solution may also perform multilingual translation for all the generated data points. A result is that the initially limited public paired dataset 202 is expanded to include benign data points, benign data points with toxicity/slang, harmful data points and harmful data points with toxicity/slang. In other words, the initial benign/harmful data point pairs are supplemented with modified pairs to expand the domain coverage for training the sanitizer model.

As mentioned above, training of the sanitizer model occurs in two stages (i.e., a first phase and a second phase). Stage 1 training is described below with respect to FIGS. 3A-3D, and Stage 2 training is described below with respect to FIG. 4.

Figure 3A:
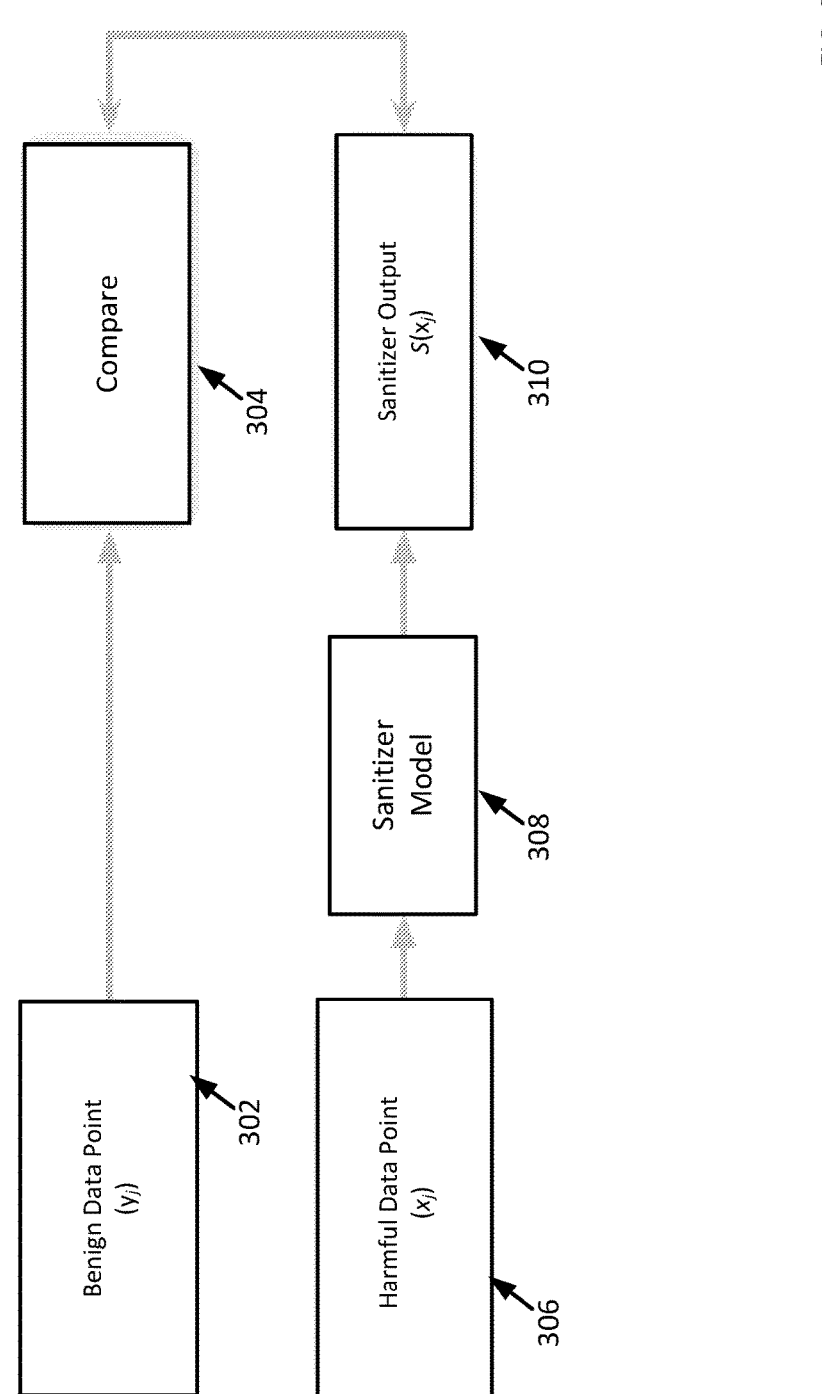
FIG. 3A shows a flowchart of stage 1 training using training loss from the generated dataset, based on the principles disclosed herein.

FIG. 3A shows a flowchart for an example method 300 of stage 1 training using training loss from the generated dataset. For stage 1 training, model training may be framed as a style transfer (from-harmful-to-non-harmful) problem. The benign and harmful dataset may be used as training points. For example, a benign data point 302 and corresponding paired harmful data point 306 may be chosen. During training, harmful data point 306 is input to the sanitizer model 308 which produces a sanitizer output 310. As mentioned above, the sanitizer output 310 is a prediction of benign data point 302. The solution in step 304 compares sanitizer output 310 to benign data point 302 to determine a loss metric. The loss metric effectively quantifies the difference between the sanitized output generated by the sanitizer model and the corresponding benign data point. One example of a loss metric may be based on the log of the ratio of information between the sanitizer model output and the ground truth of the known benign data point as shown in equation 2 below where x is the computed information of the data points.

$$\mathcal{L}_{CLM} = -\frac{1}{|x|}\sum_{i=1}^{|x|}\log P(x_i/x_{<i}) \qquad \text{(Eq. 2)}$$

This loss specifies the direction and magnitude of adjustment of the sanitizer model's weights 308. The process is repeated for another labeled pair of benign and harmful data points. In other words, the neural network 100 in FIG. 1 is trained using a loss function that compares the sanitizer output to the known benign data point with the goal of producing sanitizer outputs that closely resemble the benign data points in the pairs. The system may achieve this by attempting to minimize the loss shown in equation 1.

Model training may be useful in correctly predicting benign data points but may have a negative effect on other factors of the response presented to the end user. For example, while the model may be accurate in producing benign data points, coherence of the responses may suffer due to negative impacts on factors such as style, semantics and fluency of the response. The solution therefore ensures that the sanitizer model not only sanitizes the responses, but also maintains the desired style, semantics and fluency such that information, readability and understandability is not lost. This process is described with respect to FIGS. 3B-3D.

Figure 3B:
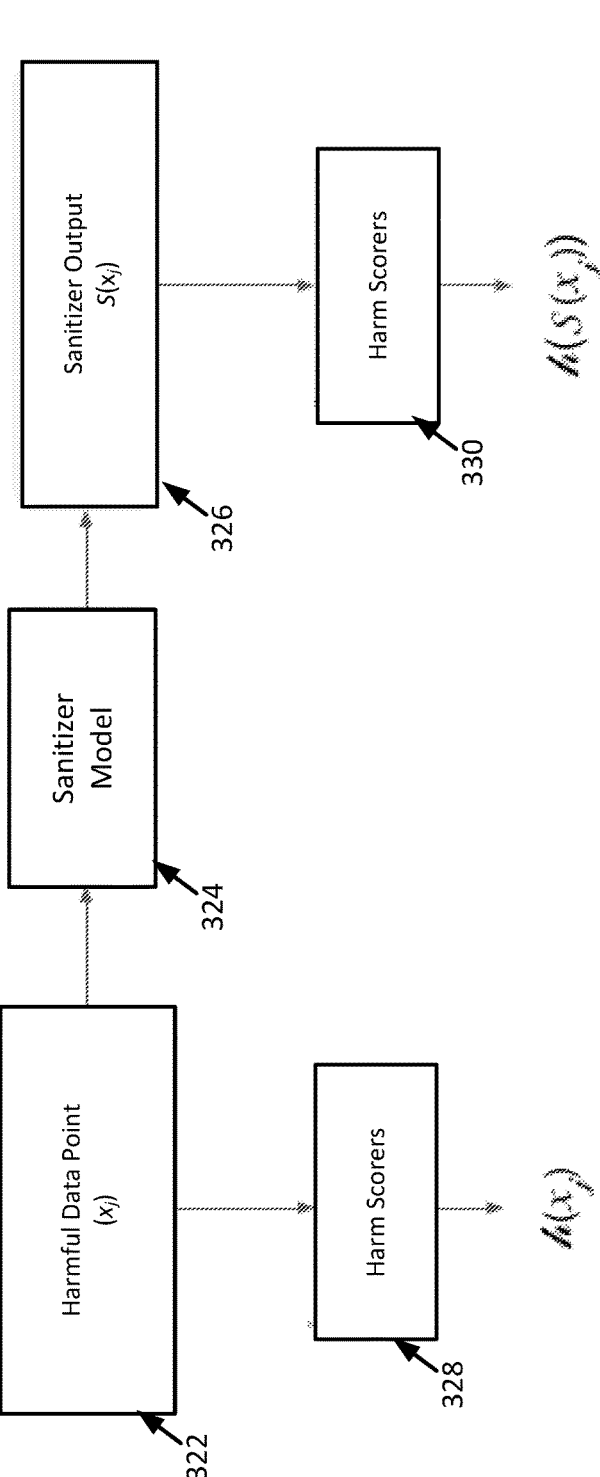
FIG. 3B shows a flowchart of stage 1 training using style loss from the generated dataset, based on the principles disclosed herein.

FIG. 3B shows a flowchart for an example method 320 of stage 1 training using style loss from the generated dataset. As mentioned above, training the sanitizer model to be accurate in producing benign data points may have a negative effect on style (e.g., formal, informal, business, academic, conversational, etc.). For example, the sanitizer may attempt to minimize the loss by generating outputs containing language that skews the style from a desirable formal style to an undesirable informal style. To ensure that style is not lost during the sanitization process, the system computes style loss between the harmful data point and the sanitizer model output. For example, trained harm scorer 328 computes a harm score for harmful data point 322. The harmful data point is input to sanitizer model 324 which outputs sanitizer output 326. The trained harm scorer 330 also computes a harm score for sanitizer output 326. The harm scores produced by the harm scorers 328 and 330 may be those as shown in equation 1 above. When both harm scores are computed, they may be compared to determine style loss. An example formulation of the style loss parameter is shown in equation 3 below where the loss is a linear or non-linear function of the difference between the harm scores of the sanitizer score output and the harmful data point. By capturing style loss during training, the sanitizer model is guided toward generating correct content of harmful data points while maintaining the overall style of the harmful data point.

$$\mathcal{L}_{style} = \mathcal{F}(h(S(x_j)) - h(x_j)) \qquad \text{(Eq. 3)}$$

Figure 3C:
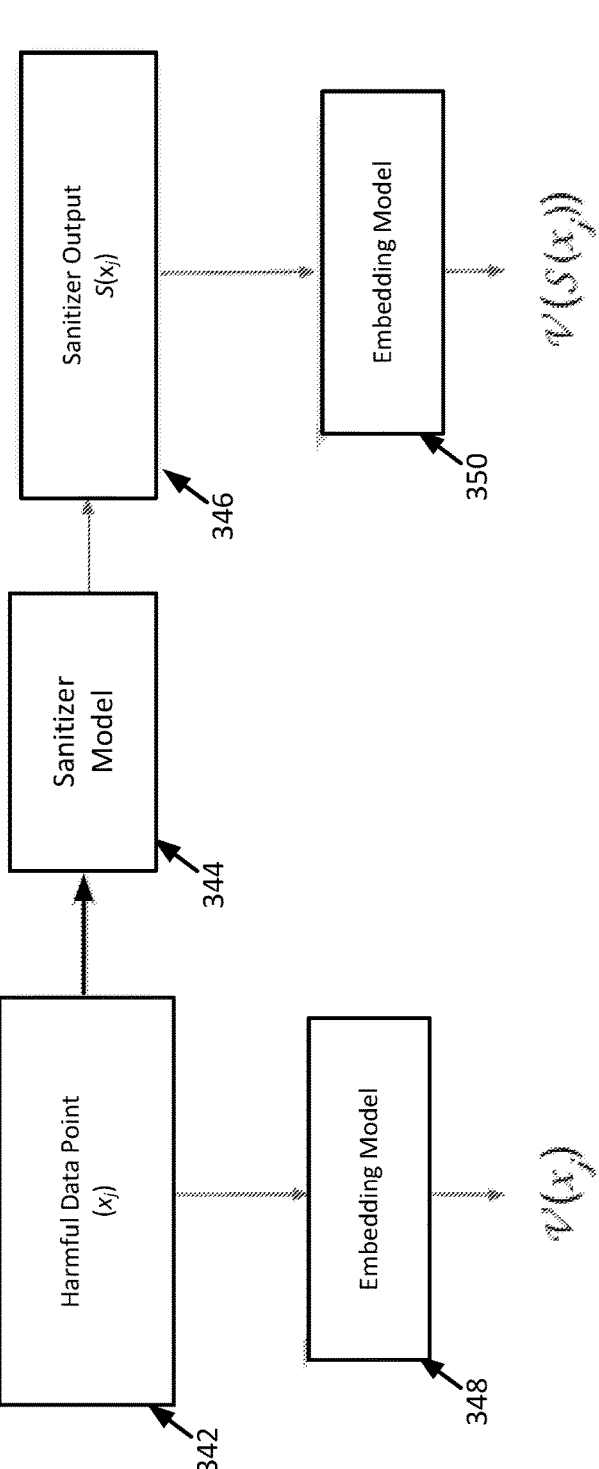
FIG. 3C shows a flowchart of stage 1 training using semantic loss from the generated dataset, based on the principles disclosed herein.

FIG. 3C shows a flowchart for an example method 340 of stage 1 training using semantic preservation loss from the generated dataset. As mentioned above, training the sanitizer model to be accurate in producing benign data points may change the meaning of the input (e.g., ambiguities, nuance, connotation, metaphors, etc.). For example, the sanitizer may correct the harmful content with language that changes the original meaning of the input. In order to ensure that semantics are not lost during the sanitization process, the system computes semantic preservation loss between the harmful data point and the sanitizer model output. For example, a trained embedding model 348 is used to embed the input into a semantic vector in high dimension space (hidden space of the trained embedding model). The semantic vector, for example, is a numerical representation of a phrase. These vectors may be generated using embedded models that analyze the context in which words appear and map them into a high-dimensional space where semantically similar words or phrases are positioned closer to each other. The harmful data point is input to sanitizer model 344 which outputs sanitized output 346. The trained embedding model 350 generates semantic vectors of the input and the output and computes the vector similarity between the input and the sanitized output 346. The higher the semantic similarity the higher the preservation of desired information/meaning and the lower the semantic preservation loss. When both semantic vectors are generated, they may be compared to determine semantic similarity (e.g., cosine similarities). An example formula of the semantic preservation loss is shown in equation 4 below where a semantic preservation is a linear or non-linear function of the semantic similarity between the semantic vector of the sanitizer output and the semantic vector of the harmful data point. By incorporating the semantic preservation loss during the sanitizer model training, the sanitizer model is persuaded towards generating an output that is close to the corresponding benign datapoint while maintaining the same semantics.

$$\mathcal{L}_{semantic\ preservation} = \text{Cosine Similarity } (V(S(x_j)), V(x_j)) \qquad \text{(Eq. 4)}$$

Figure 3D:
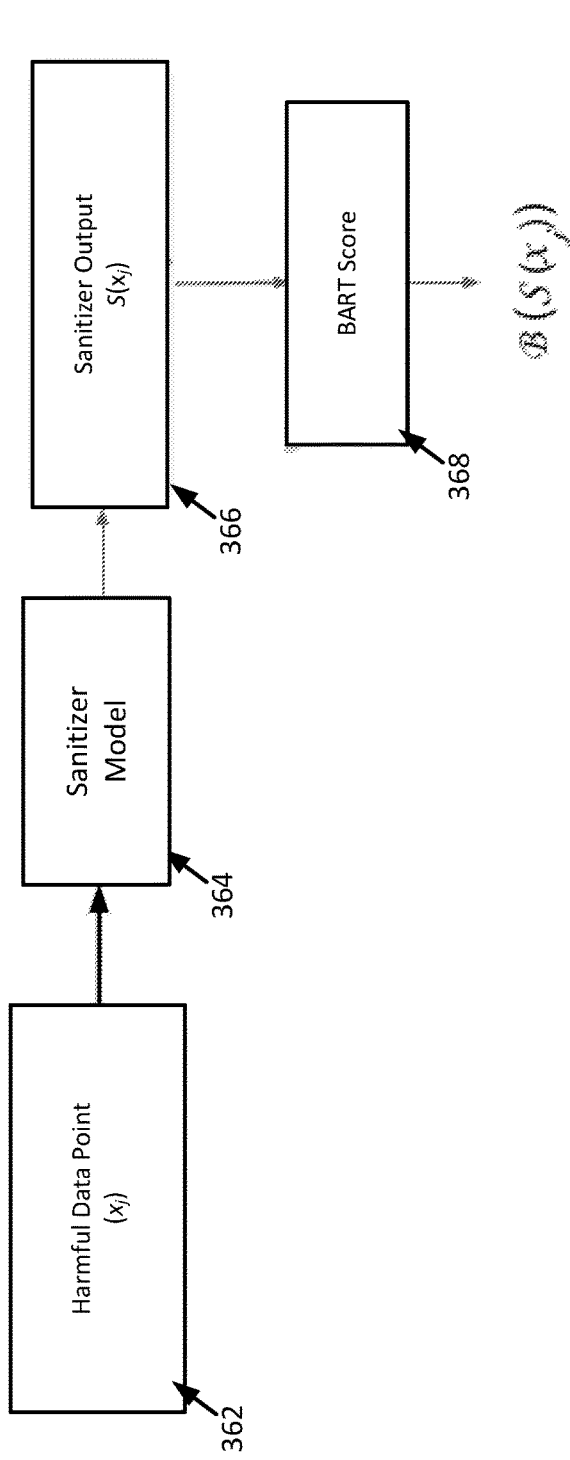
FIG. 3D shows a flowchart of stage 1 training using computing fluency loss from the generated dataset, based on the principles disclosed herein.

FIG. 3D shows a flowchart for an example method 360 of stage 1 training using fluency loss from the generated dataset. As mentioned above, training the sanitizer model to be accurate in producing benign data points may have a negative effect on fluency (e.g., readability, expressiveness, pace, coherence, etc.). For example, the sanitizer may correct the harmful content with language that skews the fluency from a desirable fluency (e.g., smooth topic transitions) to an undesirable fluency (e.g., abrupt topic transitions). In order to ensure that fluency is not lost during the sanitization process, the system computes fluency loss of the sanitizer model output. For example, the harmful data point 362 is input to sanitizer model 364 which outputs sanitizer output 366. A trained scorer 368 may compute a fluency score for sanitizer output 366. The fluency score may be based on a trained bidirectional and autoregressive transformers (BART). In other words, a BART score may be computed where the BART score is an unsupervised metric that quantifies fluency in NLP output. This BART score may be used to compute fluency loss. The BART score may be used to evaluate the naturalness and coherence of the text generated by the sanitizer model. A higher BART score may indicate that the text is more fluent, meaning it reads more like human-written text, with proper grammar, logical structure, and smooth transitions. The BART score may be particularly useful in the training and refinement of the sanitizer model to ensure that the sanitized output not only removes harmful content but also retains or improves the fluency of the text, making it readable and understandable to users. An example formulation of the fluency loss function is shown in equation 5 below where the fluency loss is a norm of the BART scores of the sanitizer output. By incorporating fluency loss during the sanitizer model's training, the sanitizer model is persuaded to towards generating accurate content of benign data points while maintaining fluency.

$$\mathcal{L}_{fluency} = \mathcal{N}orm\ (B(S(x_j))) \qquad \text{(Eq. 5)}$$

As described above, various loss functions are considered. These loss functions include causal language modeling loss, style loss, semantic preservation loss and fluency loss among others. Therefore, in one example, the overall loss function 112 of the neural network 100 of the sanitizer model may be a linear combination of all individual loss functions. For example, the total loss function may be a weighted summation of the individual loss functions as shown in equation 6 below where λ are the respective weights for individual loss functions:

$$\mathcal{L}_{total} = \mathcal{L}_{CLM} + \lambda_{SI}\mathcal{L}_{SI} + \lambda_{SP}\mathcal{L}_{SP} + \lambda_{F}\mathcal{L}_{F} \qquad \text{(Eq. 6)}$$

In other words, the loss functions may be combined to compute an overall or total loss score that may take into account all aspects of the sanitizer output. Weighting the individual loss functions provides flexibility to the system to learn relative importance of each individual loss. For example, loss functions that are not as important may be weighted less than more important loss functions. The weights for the individual loss functions in the context of the neural network may be determined through a process of hyperparameter tuning during the training phase.

Figure 4:
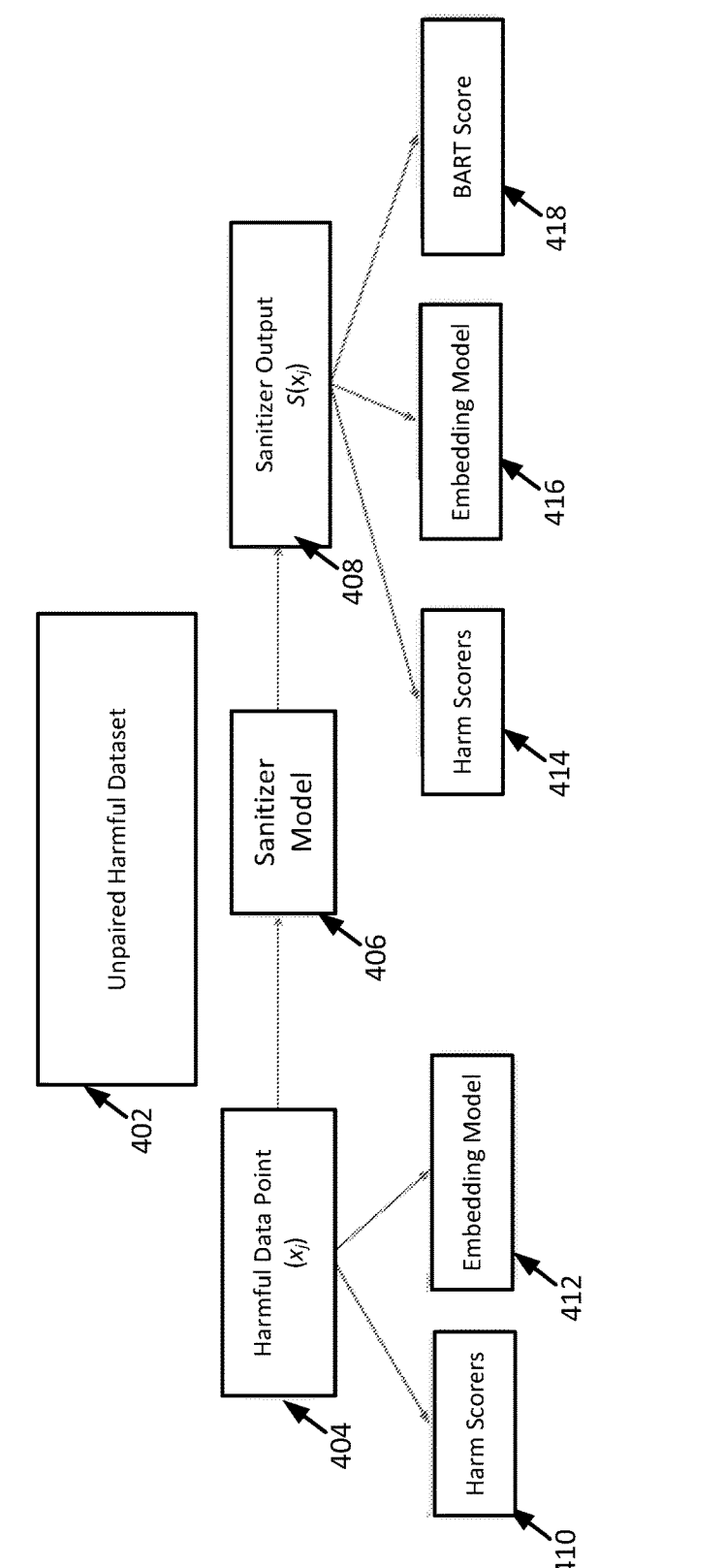
FIG. 4 shows a flowchart of stage 2 training using unpaired data, based on the principles disclosed herein.

In order to ensure model accuracy in real world unpaired datasets, the stage 1 trained sanitizer model can be additionally trained using weakly supervised techniques on a larger scale using real world unpaired data. FIG. 4 shows a flowchart for an example method 400 of stage 2 training using unpaired data. Unpaired harmful datasets 402 may be generated by the LLM in response to real world prompts. These harmful data points may be input to the stage 1 trained sanitizer model 406 which produces sanitizer output 408. Various metrics may be computed from harmful data point 404 such as harm scores and semantic preservation scores from trained semantic scorers 410 and trained embedding model 412. Similarly various metrics may be computed from sanitizer output 408 such as harm scores, semantic preservation scores and fluency scores from trained semantic scorer 414, trained embedding model 416 and BART scorer 418. These scores may be computed as a measure of sanitizer model performance in the absence of the corresponding benign output 406. In other words, when the sanitizer model processes a piece of harmful language text to produce sanitized output, there may not be a pre-labeled "correct" benign version of the text to compare against. Instead, the model's output is evaluated based on these computed scores to determine if the harmful content has been effectively reduced and if the output maintains semantic integrity and fluency. This approach allows for the assessment of the model's sanitization capabilities in real-world scenarios where paired benign and harmful datasets may not be available. For example, harm score 410 of the harmful data point 404 may be compared to harm score 414 of sanitizer output 408. In one example, if harm score 414 is less than harm score 410, the system knows that the model is reducing harmfulness of the content. The amount of harm reduction may be used to compute rewards for the sanitizer model. Positive rewards may be computed when harm is reduced, while negative rewards may be computed when harm is maintained or increased. In either case, the rewards may be used to adjust weights of the neural network of the sanitizer model accordingly. Aside from the harm score, other scores such as semantic preservation score, fluency score of the sanitizer output may be computed to determine the extent to which semantic preservation, fluency and style were changed as compared to the harmful data point. These other scores may also be used to generate appropriate rewards that may be used to adjust weights of the stage 1 trained sanitizer model. In other words, various scores as described in the equations above can be computed and compared to the scores of the harmful data point to determine how the sanitizer model is performing with respect to various metrics.

Figure 5:
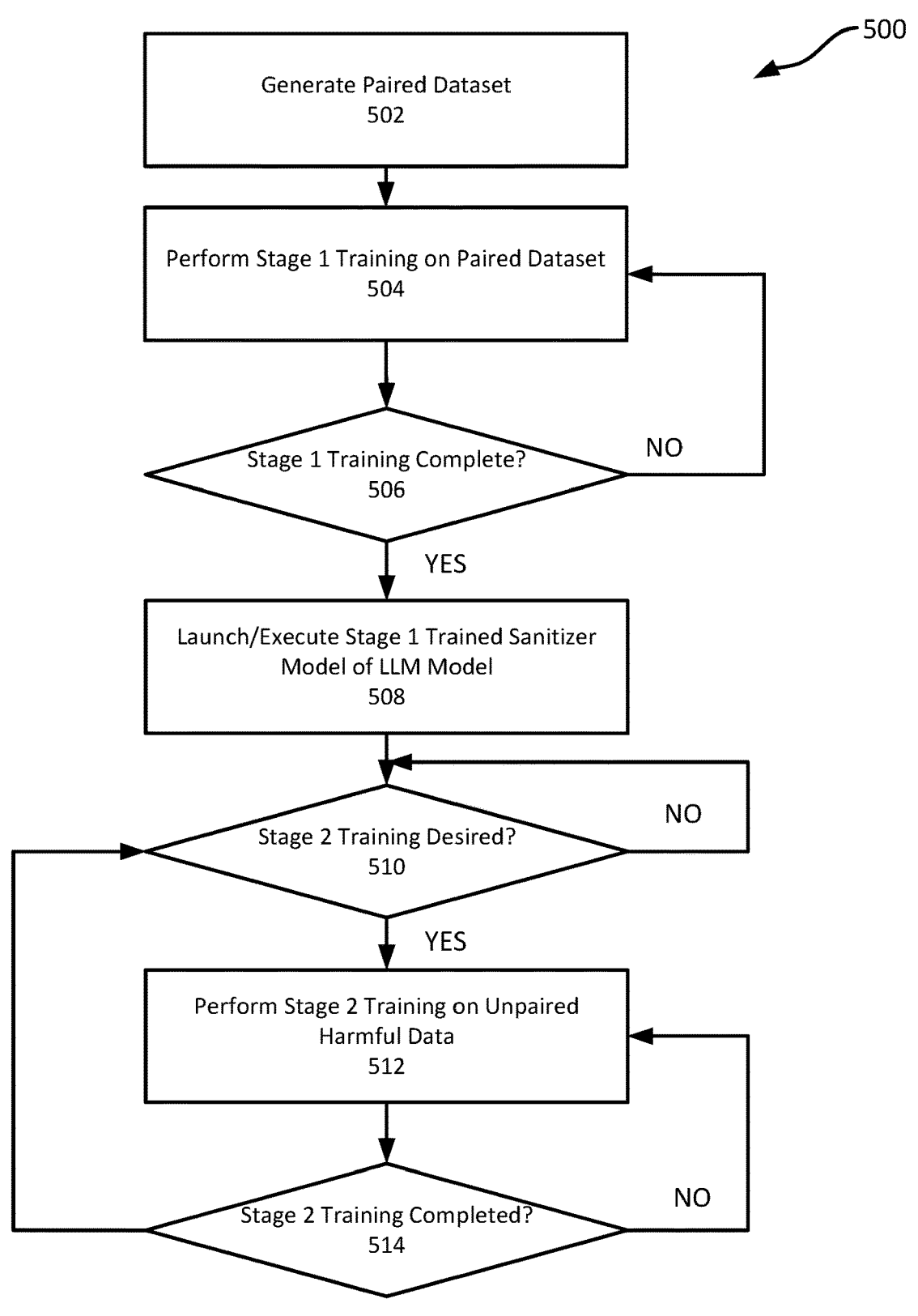
FIG. 5 shows a flowchart of generating paired datasets and multi-stage training of the sanitizer model, based on the principles disclosed herein.

As described above, the solution generates various paired datasets for supervised training, performs supervised training based on the paired datasets, deploys the LLM/sanitizer model and performs weakly supervised learning while the LLM/sanitizer model is deployed. FIG. 5 shows a flowchart for an example method 500 of generating paired datasets and multi-stage training of the sanitizer model. In step 502, the system generates paired datasets. This may include inputting benign and harmful datasets into LLMs designed to add additional harm aspects (e.g., toxicity, slang, etc.) to the datasets. The result is that a training set is generated including the initial harmful and benign data points along with harmful and benign data points with additional harm aspects such as hate, violence, slang or toxicity. In step 504, the system performs stage 1 training using the paired dataset. Stage 1 training may include supervised training of the sanitizer model by computing loss functions related to the labeled datasets as described above. If at step 506, stage 1 training is not complete, stage 1 training is continued with the paired datasets. If at step 508, stage 1 training is complete, the system deploys the stage 1 trained sanitizer model into the field or continue to stage 2 training with publicly available or private unpaired datasets. As described above, the sanitizer model may be separate from the LLM or integrated directly in the LLM. In step 510, the system performs stage 2 unsupervised training in step 512. This may include computing various loss metrics and comparisons between the input harmful data points and the sanitizer model output. These loss metrics may be used to compute positive/negative rewards that are used to adjust the neural network weights accordingly. At step 514 if stage 2 training is not complete, stage 2 training continues. At step 514, if stage 2 training is complete, the solution returns to step 510 and monitors performance until stage 2 training is needed again.

Figure 6:
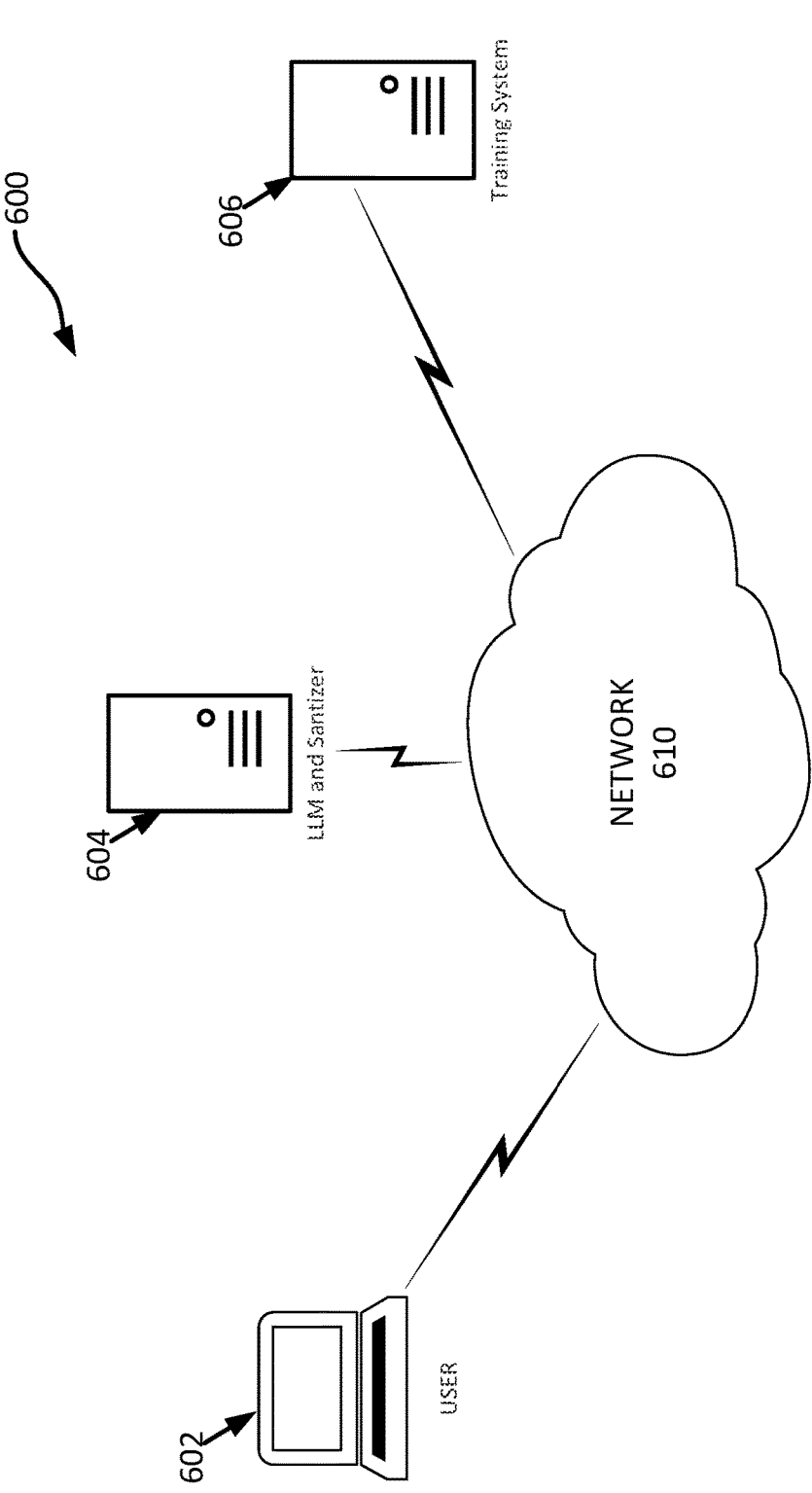
FIG. 6 shows a network diagram of the sanitizer model training and execution system, based on the principles disclosed herein.

FIG. 6 shows an example of a system 600 configured for providing the sanitizer model training and execution system disclosed herein. It should be understood that the components of the system 600 shown in FIG. 6 and described herein are merely examples and systems with additional, alternative, or fewer number of components should be considered within the scope of this disclosure.

As shown, system 600 comprises at least one end user device 602 and servers 604 and 606 interconnected through a network 610. In the illustrated example, server 604 supports operation of the LLM and sanitizer model execution and server 606 supports operation of the sanitizer model training. In the illustrated example, user device 602 is a PC, but may be any device (e.g., smartphone, tablet, etc.) providing access to the servers 604 and 606 via network 610. User device 602 has a user interface UI, which may be used to communicate with the servers using the network 610 via a browser or via software applications. For example, user device 602 may allow the user to access the LLM and sanitizer model executing on server 604, while training system server 606 may allow the operator to train the sanitizer model executing on server 604. The network 610 may be the Internet and or other public or private networks or combinations thereof. The network 610 therefore should be understood to include any type of circuit switching network, packet switching network, or a combination thereof. Non-limiting examples of the network 610 may include a local area network (LAN), metropolitan area network (MAN), wide area network (WAN), and the like.

In an example, end user device 602 may communicate with servers 604 and 606 via a software application to access the LLM and sanitizer model disclosed herein. The software application may initiate server 604 to execute the LLM and sanitizer model, while software executing on training system server 606 may allow the operator to train the sanitizer model executing on server 604, according to the systems/methods shown in FIGS. 2-5.

Servers 604, 606 and user device 602 are each depicted as single devices for ease of illustration, but those of ordinary skill in the art will appreciate that servers 604 and 606 and user device 602 may be embodied in different forms for different implementations. For example, any or each of the servers may include a plurality of servers including a plurality of databases, etc. Alternatively, the operations performed by any of the servers may be performed on fewer (e.g., one or two) servers. In another example, a plurality of user devices (not shown) may communicate with the servers. Furthermore, a single user may have multiple user devices (not shown), and/or there may be multiple users (not shown) each having their own respective user devices (not shown). Regardless, the hardware configuration shown in FIG. 6 may be a system that supports the functionality of the LLM training and execution system disclosed herein.

Figure 7:
FIG. 7 shows a block diagram of an example computing system that implements various features and processes of the sanitizer model training and execution system, based on the principles disclosed herein.

FIG. 7 shows a block diagram of an example computing device 700 that is configured for facilitating the sanitizer model training and LLM and sanitizer model execution system based on the principles disclosed herein. For example, computing device 700 may function as the servers 604, 606 and/or user device 602, or a portion or combination thereof in some embodiments. The computing device 700 performs one or more steps of the methods shown in FIGS. 2-5. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 710. Each of these components is coupled by a bus 712.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 712 includes any internal or external bus technology, including but not limited to ISA, EISA, PCI, PCI Express, USB, Serial ATA or FireWire. Computer-readable medium 710 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712.

Network communications instructions 716 establish and maintain network connections (e.g., software for implementing communication protocols, such as TCP/IP, HTTP, Ethernet, telephony, etc.). Application(s) 718 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user devices and servers. A user device and server may generally be remote from each other and may typically interact through a network. The relationship of user device and server may arise by virtue of computer programs running on the respective computers and having a relationship with each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API described herein may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, the method comprising:

generating a paired dataset for training a sanitizer model of large language model (LLM) responses, the paired dataset including benign language text and harmful language text;

executing a sanitizing step in the sanitizer model of the LLM to sanitize the harmful language text in the paired dataset to produce a sanitized language text that predicts the benign language text in the paired dataset;

training the sanitizing step of the sanitizer model of the LLM, during a first training phase prior to deploying the sanitizer model using the paired dataset, to predict the benign language text in the paired dataset based on loss of information computed between the benign language text in the paired dataset and the sanitized language text; and refining the trained sanitizing step of the sanitizer model of the LLM, during a second training phase after the deploying of the sanitizer model, wherein the refining further trains the sanitizer model using a harm model that computes a harm score indicating an amount of harmfulness of the LLM predictions, by adjusting weights of the trained sanitizing step based on a difference between the harm score of the harmful language text and the harm score of the sanitized language text to reduce the harm score for subsequent LLM responses.

2. The method of claim 1, further comprising:
training the sanitizing step of the sanitizer model of the LLM, during the first training phase using style loss of the prediction, to predict the benign language text in the paired dataset while reducing style loss.

3. The method of claim 1, further comprising:
training the sanitizing step of the sanitizer model of the LLM, during the first training phase using semantic preservation loss of the prediction, to predict the benign language text in the paired dataset while reducing semantic preservation loss.

4. The method of claim 1, further comprising:
training the sanitizing step of the sanitizer model of the LLM, during the first training phase using fluency loss of the prediction, to predict the benign language text in the paired dataset while reducing fluency loss.

5. The method of claim 1, further comprising:
computing the loss of information based on a difference between the benign language text in the paired dataset and the sanitized language text, and additional loss parameters including at least one of style loss, semantic preservation loss and fluency loss.

6. The method of claim 1, further comprising:
refining the trained sanitizing step of the sanitizer model of the LLM, during the second training phase, by adjusting the trained sanitizing step to reduce style loss, semantic preservation loss and fluency loss.

7. The method of claim 1, further comprising:
training the sanitizing step of the sanitizer model of the LLM, during the first training phase using the paired dataset, prior to launching the LLM for execution by end users.

8. The method of claim 1, further comprising:
training the sanitizing step of the sanitizer model of the LLM, during the second training phase using the paired dataset, after launching the LLM for execution by end users.

9. The method of claim 1, further comprising:
generating the harmful language text in the paired dataset by adding harmful language text to the benign language text.

10. The method of claim 5, further comprising:
computing the semantic preservation loss based on cosine similarity between the harmful language text and the sanitized language text; and
computing the fluency loss based on a BART score of the sanitized language text.

11. A system comprising:
a non-transitory storage medium storing computer program instructions; and
one or more processors configured to execute the computer program instructions to cause operations comprising:

generating a paired dataset for training a sanitizer model of large language model (LLM) responses, the paired dataset including benign language text and harmful language text;

executing a sanitizing step in the sanitizer model of the LLM to sanitize the harmful language text in the paired dataset to produce a sanitized language text that predicts the benign language text in the paired dataset;

training the sanitizing step of the sanitizer model of the LLM, during a first training phase prior to deploying the sanitizer model using the paired dataset, to predict the benign language text in the paired dataset based on loss of information computed between the benign language text in the paired dataset and the sanitized language text; and refining the trained sanitizing step of the sanitizer model of the LLM, during a second training phase after the deploying of the sanitizer model, wherein the refining further trains the sanitizer model using a harm model that computes a harm score indicating an amount of harmfulness of the LLM predictions, by adjusting weights of the trained sanitizing step based on a difference between the harm score of the harmful language text and the harm score of the sanitized language text to reduce the harm score for subsequent LLM responses.

12. The system of claim 11, wherein the operations further comprise:
training the sanitizing step of the sanitizer model of the LLM, during the first training phase using style loss of the prediction, to predict the benign language text in the paired dataset while reducing style loss.

13. The system of claim 11, wherein the operations further comprise:
training the sanitizing step of the sanitizer model of the LLM, during the first training phase using semantic preservation loss of the prediction, to predict the benign language text in the paired dataset while reducing semantic preservation loss.

14. The system of claim 11, wherein the operations further comprise:
training the sanitizing step of the sanitizer model of the LLM, during the first training phase using fluency loss of the prediction, to predict the benign language text in the paired dataset while reducing fluency loss.

15. The system of claim 11, wherein the operations further comprise:
computing the loss of information based on a difference between the benign language text in the paired dataset and the sanitized language text, and additional loss parameters including at least one of style loss, semantic preservation loss and fluency loss.

16. The system of claim 11, wherein the operations further comprise:
refining the trained sanitizing step of the sanitizer model of the LLM, during the second training phase, by adjusting the trained sanitizing step to reduce style loss, semantic preservation loss and fluency loss.

17. The system of claim 11, wherein the operations further comprise:
training the sanitizing step of the sanitizer model of the LLM, during the first training phase using the paired dataset, prior to launching the LLM for execution by end users.

18. The system of claim 11, wherein the operations further comprise:

training the sanitizing step of the sanitizer model of the LLM, during the second training phase using the paired dataset, after launching the LLM for execution by end users.

19. The system of claim 11, wherein the operations further comprise:

generating the harmful language text in the paired dataset by adding harmful language text to the benign language text.

20. The system of claim 15, wherein the operations further comprise:

computing the semantic preservation loss based on cosine similarity between the harmful language text and the sanitized language text; and computing the fluency loss based on a BART score of the sanitized language text.

\* \* \* \* \*